(12) United States Patent
Ishizaki et al.

(10) Patent No.: US 10,550,883 B2
(45) Date of Patent: Feb. 4, 2020

(54) ATTACHMENT STRUCTURE FOR SLIDING SCRAPER, AND LINEAR GUIDE DEVICE

(71) Applicants: NITTA CORPORATION, Osaka-shi, Osaka (JP); THK CO., LTD., Tokyo (JP)

(72) Inventors: Yoji Ishizaki, Yamatokoriyama (JP); Atsushi Matsumoto, Yamatokoriyama (JP); Kenichiro Aoki, Yamatokoriyama (JP); Ryuji Furusawa, Tokyo (JP); Sho Iwashiro, Tokyo (JP)

(73) Assignees: NITTA CORPORATION, Osaka-shi (JP); THK CO., LTD., Tokyo (JP)

( * ) Notice: Subject to any disclaimer, the term of this patent is extended or adjusted under 35 U.S.C. 154(b) by 0 days.

(21) Appl. No.: 16/301,800

(22) PCT Filed: Mar. 23, 2017

(86) PCT No.: PCT/JP2017/011703
§ 371 (c)(1),
(2) Date: Nov. 15, 2018

(87) PCT Pub. No.: WO2017/199579
PCT Pub. Date: Nov. 23, 2017

(65) Prior Publication Data
US 2019/0162230 A1    May 30, 2019

(30) Foreign Application Priority Data

May 16, 2016    (JP) .................................. 2016-098267
Feb. 21, 2017   (JP) .................................. 2017-030252

(51) Int. Cl.
*F16C 29/06*    (2006.01)
*F16C 29/08*    (2006.01)
*F16C 33/76*    (2006.01)

(52) U.S. Cl.
CPC ........ *F16C 29/086* (2013.01); *F16C 29/0609* (2013.01); *F16C 33/76* (2013.01); *F16C 2322/39* (2013.01)

(58) Field of Classification Search
CPC .... F16C 29/086; F16C 29/0609; F16C 33/76; F16C 2322/39
See application file for complete search history.

(56) References Cited

U.S. PATENT DOCUMENTS

| 5,494,354 A | * | 2/1996 | Tsukada | .............. F16C 29/0642 |
| | | | | 384/13 |
| 6,877,900 B2 | * | 4/2005 | Mochizuki | .......... F16C 29/0647 |
| | | | | 384/15 |

(Continued)

FOREIGN PATENT DOCUMENTS

| JP | 2003-232350 A | 8/2003 |
| JP | 2004-340362 A | 12/2004 |

(Continued)

OTHER PUBLICATIONS

Jun. 20, 2017 Search Report issued in International Patent Application No. PCT/JP2017/011703.

*Primary Examiner* — Thomas R Hannon
(74) *Attorney, Agent, or Firm* — Oliff PLC

(57) ABSTRACT

A slider slidably straddling over a guide rail, an attachment plate having a square U-shape attached to an end surface of the slider and including opposite vertical frames and a horizontal frame connecting the vertical frames, and a sliding scraper fitted in a square U-shape groove of the attachment plate and including opposite vertical portions and a horizontal portion connecting the opposite vertical portions, and a groove portion that is in sliding contact with the guide rail are provided, and protrusion portions at which the vertical frames and the vertical portions are in abutment with each other are provided an open end portion of an inner (Continued)

side surface of each of the opposite vertical frames of the attachment plate or an end portion of an outer side surface of each of the opposite vertical portions of the sliding scraper, the end portion facing the relevant open end portion.

7 Claims, 6 Drawing Sheets

(56) References Cited

U.S. PATENT DOCUMENTS

| | | | |
|---|---|---|---|
| 2004/0228551 A1* | 11/2004 | Tsukada | F16C 29/0642 |
| | | | 384/45 |
| 2006/0029303 A1 | 2/2006 | Ubukata et al. | |
| 2009/0245701 A1* | 10/2009 | Ogura | F16C 29/0609 |
| | | | 384/15 |
| 2011/0138942 A1 | 6/2011 | Murata | |

FOREIGN PATENT DOCUMENTS

| | | |
|---|---|---|
| JP | 2006-046529 A | 2/2006 |
| JP | 4232389 B2 | 3/2009 |
| JP | 2011-127770 A | 6/2011 |

* cited by examiner

ATTACHMENT STRUCTURE FOR SLIDING SCRAPER, AND LINEAR GUIDE DEVICE

TECHNICAL FIELD

The present invention relates to an attachment structure for a sliding scraper attached to a slider that runs along a guide rail, and a linear guide device.

BACKGROUND ART

Conventionally, a linear guide device includes a guide rail and a slider slidably straddling over the guide rail (Patent Literature 1). An attachment plate is attached to each of end surfaces in a sliding direction of the slider and a sliding scraper is received in a recess groove of the attachment plate.

The sliding scraper is formed of an elastic material such as rubber and is in abutment with an upper surface and opposite side portions of the guide rail and thus sealed so as to prevent foreign substances from entering the inside of the slider from a gap between the slider and the guide rail.

CITATION LIST

Patent Literature

Patent Literature 1: Japanese Patent No. 4232389

SUMMARY OF INVENTION

Technical Problem

A sliding scraper is formed by vulcanization molding of an elastomer such as rubber and after demolding, the vulcanization-molded sliding scraper tends to contract in the direction indicated by arrow X in FIG. 8A.

When such a sliding scraper 7 is fitted in an attachment plate 2 and installed on a guide rail 3 as illustrated in FIG. 8B, a gap 8 is liable to form between the sliding scraper 7 and opposite side surfaces of the guide rail 3 because of deformation due to molding shrinkage. There is a risk of entry of foreign substances such as dust from such a gap 8.

An object of the present invention is to provide an attachment structure for a sliding scraper, the attachment structure more reliably ensuring close contact with a guide rail, and a linear guide device.

Solution to Problem

An attachment structure for a sliding scraper according to the present invention includes: a slider slidably straddling over a guide rail; an attachment plate having a square U-shape attached to an end surface of the slider and including opposite vertical frames and a horizontal frame connecting the opposite vertical frames; and a sliding scraper fitted in a square U-shape groove of the attachment plate and including opposite vertical portions and a horizontal portion connecting the opposite vertical portions, and a groove portion that is in sliding contact with the guide rail, and at at least an open end portion of an inner side surface of each of the opposite vertical frames of the attachment plate or at least an end portion of an outer side surface of each of the opposite vertical portions of the sliding scraper, the end portion facing the open end portion, a protrusion portion at which the relevant vertical frame and the relevant vertical portion are in abutment with each other is provided.

A linear guide device according to the present invention is a linear guide device including a guide rail and a slider slidably straddling over the guide rail, a sliding scraper including a groove portion that is in sliding contact with the guide rail being fitted in a square U-shape groove of an attachment plate attached to an end surface in a sliding direction of the slider, wherein the sliding scraper includes the above-stated attachment structure.

Advantageous Effect of Invention

In an attachment structure for a sliding scraper according to the present invention, a protrusion portion at which a vertical frame and a relevant vertical portion are in abutment with each other is provided at at least an open end portion of an inner side surface of each of opposite vertical frames of an attachment plate or at least an end portion of an outer side surface of each of opposite vertical portions of the sliding scraper, the end portion facing the open end portion, and thus the opposite vertical portions of the sliding scraper are pressed against respective side surfaces of a guide rail, more reliably ensuring that the sliding scraper is in close contact with the guide rail and thus enabling prevention of entry of foreign substances.

DESCRIPTION OF EMBODIMENTS

Embodiments of the present invention will be described in detail below with reference to the drawings.

1. First Embodiment

Figure 1:
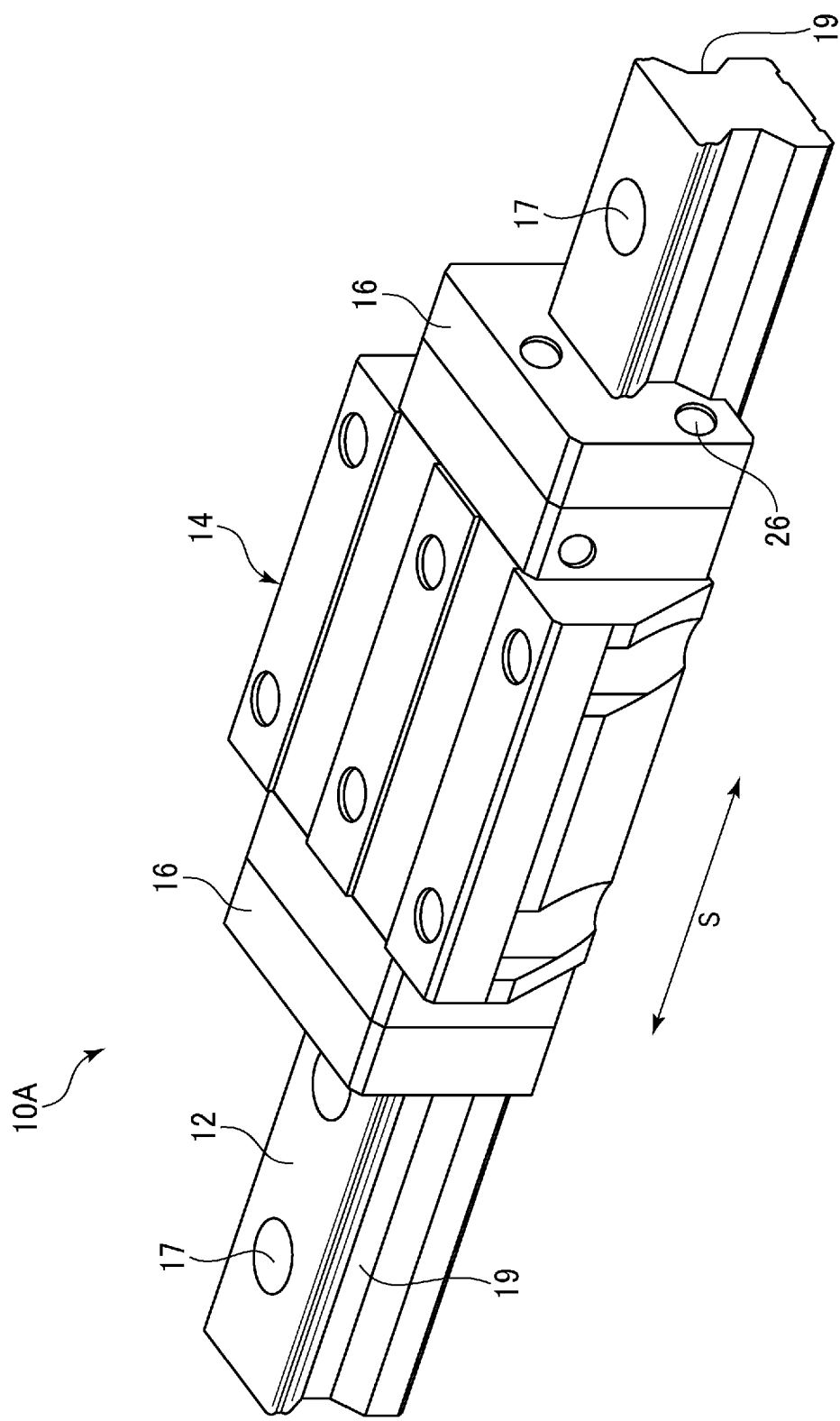
FIG. 1 is a perspective view of a linear guide device according to a first embodiment.

As illustrated in FIG. 1, a linear guide device 10A includes a guide rail 12 and a slider 14 slidably straddling over the guide rail 12. Inside the slider 14, rolling elements that move along side surfaces 19 of the guide rail 12 such as balls or tapered rollers (not illustrated) are provided.

Figure 2:
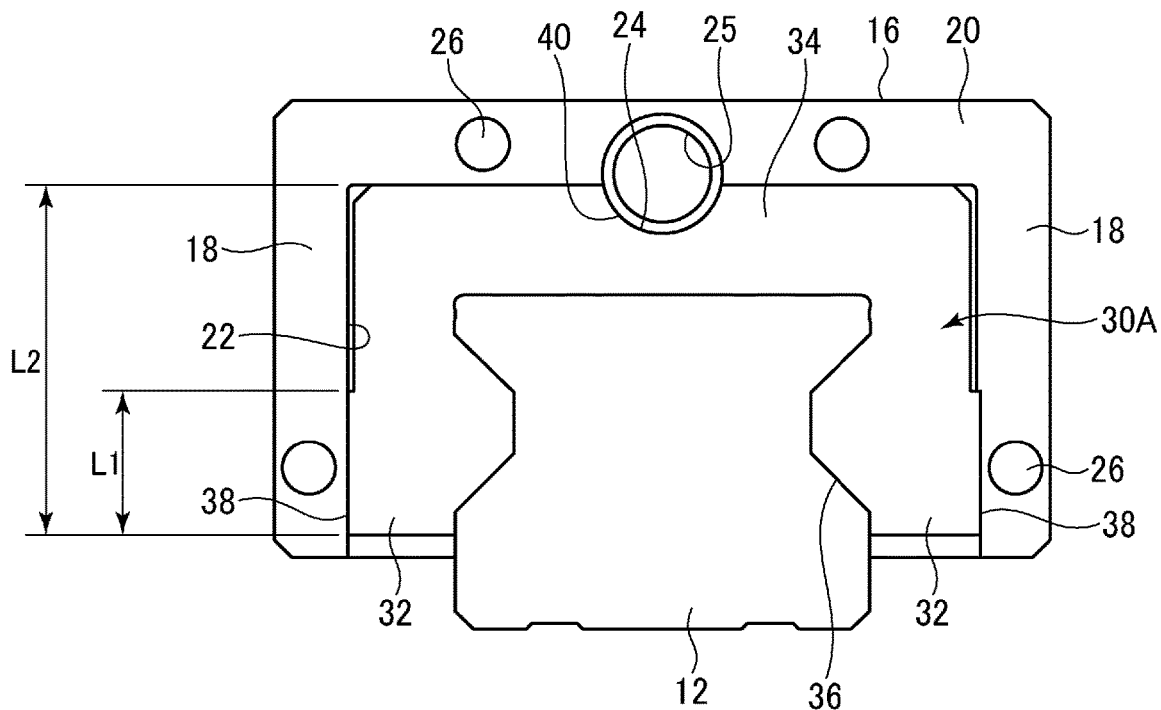
FIG. 2 is a front view illustrating a state in which a sliding scraper according to the first embodiment is attached to an attachment plate.

A square U-shape attachment plate 16 is attached to at least one end surface in a sliding direction (indicated by arrow S) of the slider 14, via, e.g., screws. As illustrated in FIG. 2, the attachment plate 16 includes a square U-shape groove 22 formed by opposite vertical frames 18 and a horizontal frame 20 connecting the opposite vertical frames 18.

At a substantial center portion of the horizontal frame 20 of the attachment plate 16, an arc-like bulge portion 24 that projects inside the square U-shape groove 22 of the attachment plate 16 is formed. A sliding scraper 30A, to be described later, that is in sliding contact with an upper surface and opposite side surfaces of the guide rail 12 at a groove portion 36 is fitted in the square U-shape groove 22 of the attachment plate 16.

Attachment screw holes 26 for attachment to the above-described slider 14 are provided in the vertical frames 18 and the horizontal frame 20 of the attachment plate 16. Also, a hole 25 extending through the horizontal frame 20 is formed in the arc-like bulge portion 24 provided in the horizontal frame 20 of the attachment plate 16. The hole 25 have a function that, for example, supplies grease to the linear guide device 10A. A material of the attachment plate 16 is not specifically limited and examples of the material of the attachment plate 16 include metals and resins.

As illustrated in FIG. 2, the sliding scraper 30A includes opposite vertical portions 32, 32 and a horizontal portion 34 connecting the opposite vertical portions 32, 32, and the groove portion 36 including a sliding layer that is in sliding contact with the guide rail 12 is formed by the opposite vertical portions 32, 32 and the horizontal portion 34.

Also, the sliding scraper 30A is provided with protrusion portions 38 at respective outer side surfaces of the opposite vertical portions 32, 32 facing the respective vertical frames 18 of the attachment plate 16, the protrusion portions 38 being in abutment with respective inner side surfaces of the vertical frames 18 of the attachment plate 16. Each of the protrusion portions 38 is formed at an end portion facing an open end portion of a relevant inner side surface of the square U-shape groove 22 of the attachment plate 16 (hereinafter, sometimes referred to as "lower end").

Also, a recess portion 40 is provided in an outer surface of the horizontal portion 34, the outer surface facing the horizontal frame 20 of the attachment plate 16. The recess portion 40 is provided in the vicinity of a substantial center portion of the horizontal portion 34 and is in abutment with a lower end portion of the bulge portion 24 projecting inside the square U-shape groove 22 of the attachment plate 16.

The protrusion portions 38 provided at the respective lower ends of the sliding scraper 30A are in abutment with the vertical frames 18 at side surfaces of the attachment plate 16. In this case, a distance between end surfaces of the opposite protrusion portions 38, 38 is preferably equal to or slightly larger than a distance between the vertical frames 18, 18 of the attachment plate 16 (that is, a distance between the inner side surfaces of the square U-shape groove 22). Consequently, the sliding scraper 30A is pressed against the side surfaces of the guide rail 12, enabling suppression of formation of a gap.

Also, it is preferable that a length L1 in a vertical direction of the protrusion portions 38 be no more than 60%, preferably no more than 50%, but no less than 5%, preferably no less than 10%, of a height L2 of the vertical portions 32 of the sliding scraper 30A.

On the other hand, the recess portion 40 provided in the horizontal portion 34 is in abutment with and thereby pressed by the lower end portion of the bulge portion 24 of the attachment plate 16, enabling suppression of formation of a gap between the upper surface of the guide rail 12 and the sliding scraper 30A.

A force of the sliding scraper 30A abutting on the guide rail 12 can be adjusted by changing a size or a shape of the protrusion portions 38 or the recess portion 40 or positions in outer surfaces of the sliding scraper 30A where the protrusion portions 38 or the recess portion 40 are formed. The protrusion portions 38 and the recess portion 40 may be simultaneously molded at the time of molding of the sliding scraper 30A or may be formed by, e.g., subjecting the sliding scraper 30A to cutting work after molding of the sliding scraper 30A.

As illustrated in FIG. 2, the sliding scraper 30A is fitted in the square U-shape groove 22 of the attachment plate 16. The square U-shape groove 22 may be formed in an inner portion of the attachment plate 16 or may be formed in a front surface of the attachment plate 16 on the opposite side of a surface of attachment to the slider 14.

When the attachment plate 16 is attached to the slider 14, the attachment plate 16 serves as a retainer plate that presses the sliding scraper 30A against the slider 14.

The shape of the recess portion 40 is not limited to an arc-like shape such as illustrated in FIG. 2 and may be, for example, a polygonal shape, a triangular shape or a rectangular shape.

The sliding scraper 30A includes an elastic material (elastomer) including a sliding layer at inner surfaces (that is, surfaces forming the groove portion 36). The sliding layer is a layer formed by integration of fiber and an elastomer and has a low resistance to sliding on the guide rail 12 and has an excellent resistance to slide friction.

The elastomer mainly enhances durability of the fiber. Examples of the elastomer include elastomers such as natural rubber, nitrile rubber, chloroprene rubber, Hypalon, polybutadiene rubber, ethylene-propylene rubber (EPM), ethylene-propylene-diene terpolymer (EPDM), hydrogenated acrylonitrilebutadiene rubber (H-NBR), silicon rubber, fluorine-contained rubber, acrylic rubber, styrene-butadiene rubber, chlorinated polyethylene rubber, millable urethane, thermosetting polyurethane, thermoplastic polyurethane and thermoplastic polyester, and one or more of such elastomers are used.

A vulcanizing agent, a vulcanizing accelerator aid and a reinforcing agent may be mixed in the elastomer forming the sliding layer. Examples of the vulcanizing agent include, e.g., organic peroxides such as dicumyl peroxide, organic sulfur compounds and metal oxides. Examples of the vulcanizing accelerator aid include, e.g., fatty acids such as stearic acid and metal oxides. Examples of the reinforcing agent include, e.g., carbon black and white carbon. Furthermore, for example, an antioxidant, a filler, a plasticizer and/or an adhesive may be mixed. In addition to these agents, graphite, silicon oil, fluorine powder or a solid lubricant such as molybdenum disulfide may be contained in the elastomer.

The fiber forming the sliding layer is in sliding contact with the guide rail 12 and thereby can reduce a resistance to sliding on the periphery of the guide rail 12. Examples of the fiber include, e.g., nylon fiber, aramid fiber, polyester fiber, carbon fiber, Teflon (registered trademark) fiber, liquid-crystal polymer fiber, glass fiber and cotton yarn. Also, the fiber may have a form of a fabric material or may be mixed in the elastomer in the form of short fibers.

The sliding layer may include a fabric material with an elastomer impregnated therein. Where the fiber has a form of a fabric material, the fabric material and the elastomer are integrated at the time of molding so that the fabric material contacts and slides on the guide rail 12. On the other hand, where the fabric has a form of short fibers, the short fibers are mixed into the elastomer and then subjected to integral molding. For the fabric material, woven fabric, knitted fabric or non-woven fabric may be employed.

As described above, as a result of provision of the protrusion portions 38 at the respective vertical portions 32, the protrusion portions 38 being in abutment with the respective inner surfaces of the vertical frames 18 inside the square U-shape groove 22 of the attachment plate 16, the sliding scraper 30A prevents formation of a gap between the sliding scraper 30A and the guide rail 12, enabling prevention of entry of foreign substances. Furthermore, the sliding scraper 30A is in uniform contact with the guide rail 12 and thus provides no excessive sliding resistance. Attachment of such a sliding scraper 30A to the slider 14 illustrated in FIG. 1 enables smooth movement of the linear guide device 10A on the guide rail 12.

As a result of the protrusion portions 38 being in abutment with the respective vertical frames 18, the opposite vertical portions 32, 32 of the sliding scraper 30A are pressed against the respective side surfaces of the guide rail 12 and thus is more reliably brought in close contact with the side surfaces of the guide rail 12, enabling prevention of entry of foreign substances.

The sliding scraper 30A includes the sliding layer, enabling reduction in sliding resistance, smooth movement of the guide rail 12 and enhancement in durability.

(Modification)

Figure 3:
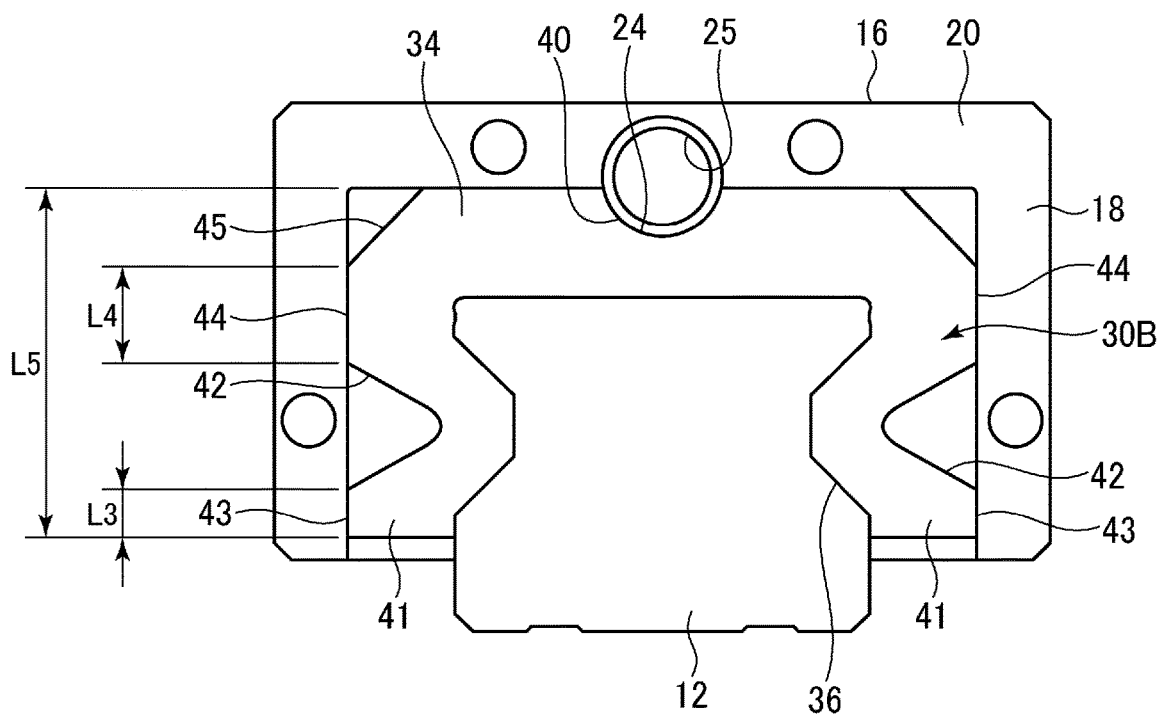
FIG. 3 is a front view illustrating a state in which a sliding scraper according to a modification of the first embodiment is attached to an attachment plate.

FIG. 3 illustrates a modification of the sliding scraper 30A illustrated in FIG. 2. In a sliding scraper 30B, which is illustrated in the figure, a cutout portion 42 is formed in each of outer side surfaces of opposite-side vertical portions 41 and protrusion portions 43, 44 are formed at a lower end portion and an upper end portion, respectively, with a gap formed by the cutout portion 42 therebetween. A gap is formed between the protrusion portion 44 at the upper end portion and the attachment plate 16 by a chamfered portion 45 formed at an upper end of the sliding scraper 30B.

Here, as in the above, it is preferable that a total length in a vertical direction (L3+L4) of the two protrusion portions 43, 44 be no more than 60%, preferably no more than 50%, but no less than 5%, preferably no less than 10%, of a height L5 of the vertical portions 41 of the sliding scraper 30B.

The other components are similar to those of the attachment structure for the sliding scraper 30A illustrated in FIG. 2, and thus such components are provided with reference numerals that are the same as those of the attachment structure for the sliding scraper 30A and description thereof will be omitted.

In the case of the present modification, as a result of the protrusion portions 43, 44 being abutment with the vertical frames 18, the opposite vertical portions 41, 41 of the sliding scraper 30B are pressed against side surfaces of a guide rail 12 and thus effects that are similar to those of the above-described embodiment can be obtained.

Although the present embodiment has been described in terms of a case where a sliding scraper includes a sliding layer at a surface forming a groove portion 36, the sliding layer may be omitted when appropriate.

2. Second Embodiment

Figure 4A:
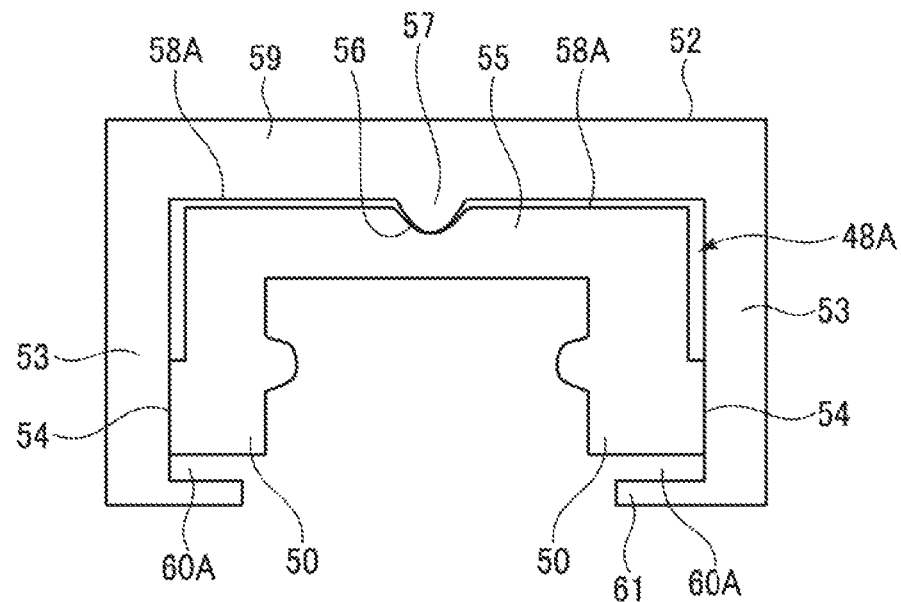
FIG. 4A is a front view illustrating a state in which a sliding scraper according to a second embodiment is attached to an attachment plate and FIG. 4B is a front view illustrating a state in which a sliding scraper according to modification (1) of the second embodiment is attached to an attachment plate.
Figure 4B:
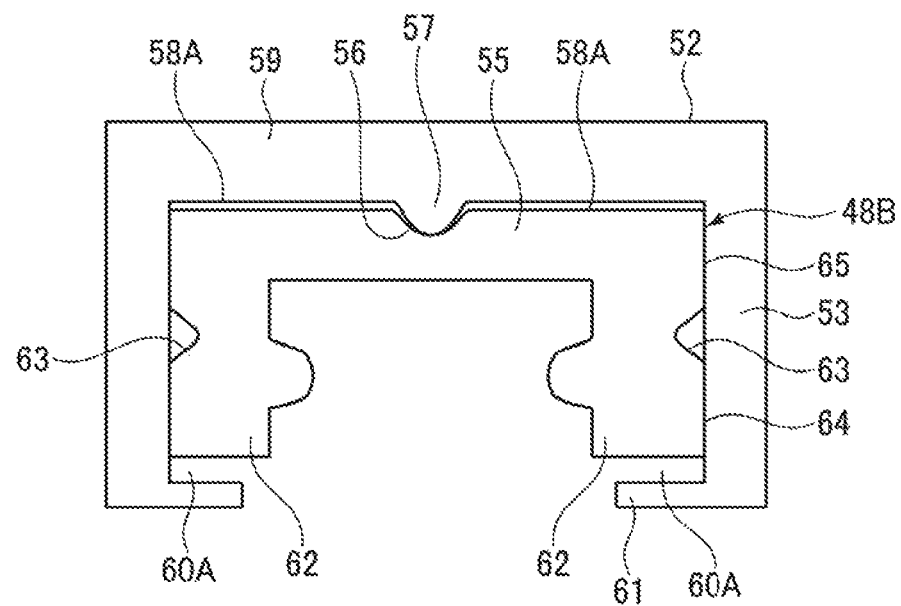

FIGS. 4A and 4B illustrate attachment structures for sliding scrapers 48A, 48B according to a second embodiment of the present invention, respectively. As with the sliding scraper 30A illustrated in FIG. 2, the sliding scraper 48A illustrated in FIG. 4A includes a protrusion portion 54 at a lower end of an outer side surface of each vertical portion 50, the protrusion portion 54 being is in abutment with a relevant vertical frame 53 of an attachment plate 52.

Also, a recess portion 56 is formed at a substantial center portion of a horizontal portion 55 of a sliding scraper 48A and is in abutment with an arc-like bulge portion 57 at a substantial center portion of a horizontal frame 59 of an attachment plate 52. In this case, a gap 58A is formed between the horizontal frame 59 and the horizontal portion 55 of the sliding scraper 48A except a part of the abutment between the recess portion 56 and the bulge portion 57.

Also, the attachment plate 52 includes a projection portion 61 formed at a lower end of each vertical frame 53, the projection portion 61 projecting inward, and a gap 60A is also formed between the projection portion 61 and a relevant lower end surface of the sliding scraper 48A.

As a result of provision of the gaps 58A, 60A, a clearance portion for the sliding scraper 48A is secured, enabling reduction in sliding resistance. The other components are similar to those of the above-described embodiment.

As a result of the protrusion portions 54 being in abutment with the respective vertical frames 53, the opposite vertical portions 50, 50 of the sliding scraper 48A are pressed against respective side surfaces of a guide rail 12 and thus effects that are similar to those of the above-described embodiment can be obtained.

FIG. 4B illustrates a modification of the sliding scraper 48A illustrated in FIG. 4A. As illustrated in FIG. 4B, the sliding scraper 48B includes a cutout portion 63 formed in an outer side surface of each of opposite-side vertical portions 62 connected via a horizontal portion 55, and protrusion portions 64, 65 are formed at a lower end portion and an upper end portion of the sliding scraper 48B, respectively, with a gap formed by the cutout portion 63 therebetween. The other components are similar to those of the above-described embodiment and thus are provided with reference numerals that are the same as those of the above-described embodiment, and description thereof will be omitted.

Since the gaps 58A, 60A are provided, effects that are similar to those of the present embodiment can be obtained. Also, as a result of the protrusion portions 64, 65 being in abutment with the respective vertical frames 53, the opposite vertical portions 62 of the sliding scraper 48B are pressed against respective side surfaces of a guide rail 12 and thus effects that are similar to those of the above-described first embodiment can be obtained.

Figure 5A:
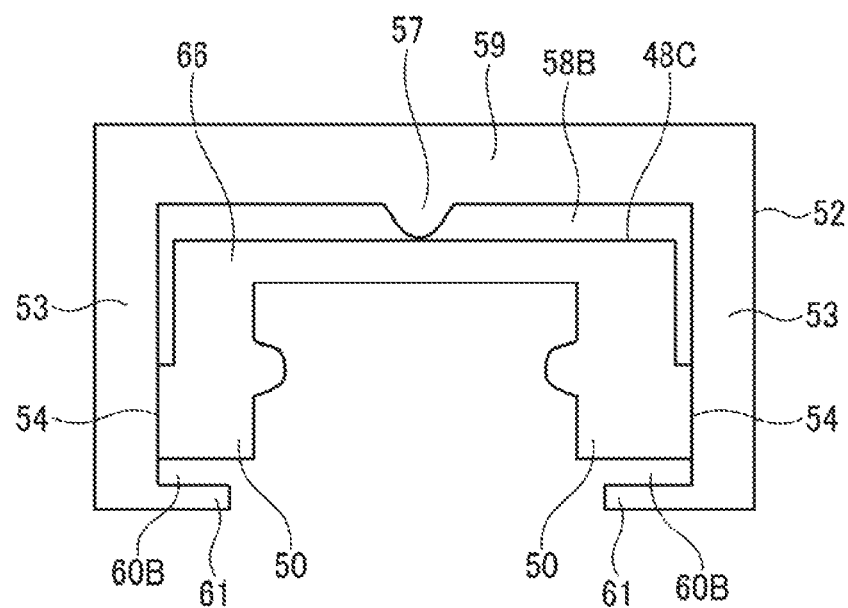
FIG. 5A is a front view illustrating a state in which a sliding scraper according to modification (2) of the second embodiment is attached to an attachment plate and FIG. 5B is a front view illustrating a state in which a sliding scraper according to modification (3) of the second embodiment is attached to an attachment plate.
Figure 5B:
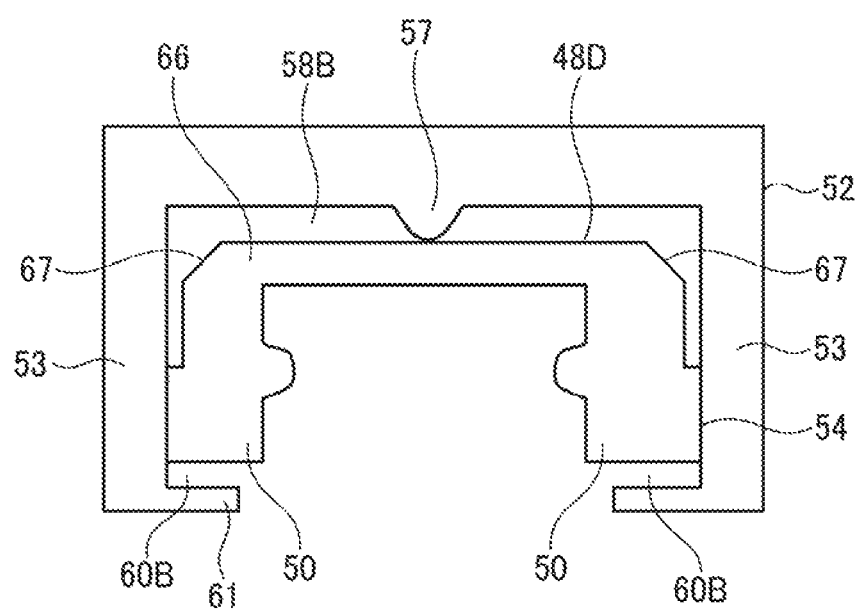

FIGS. 5A and 5B illustrate attachment structures for sliding scrapers 48C, 48D according to yet another modification of the present invention, respectively. As with the sliding scraper 30A illustrated in FIG. 2, the sliding scraper 48C illustrated in FIG. 5A includes a protrusion portion 54 at a lower end of an outer side surface of each vertical portion 50, the protrusion portion 54 being in abutment with a relevant vertical frame 53 of an attachment plate 52.

Also, in a substantial center portion of a horizontal portion 66 of the sliding scraper 48C, no recess portion 56 such as the one illustrated in FIG. 4A is formed, and an arc-like bulge portion 57 formed at a substantial center portion of a horizontal frame 59 of an attachment plate 52 is in direct abutment with the horizontal portion 66. In this case, a gap 58B is formed between the horizontal frame 59 and the horizontal portion 66 of the sliding scraper 48C except a part of the abutment between the bulge portion 57 and the horizontal portion 66.

Also, the attachment plate 52 includes a projection portion 61 at a lower end of each vertical frame 53, the projection portion 61 projecting inward, and a gap 60B is formed between the attachment plate 52 and each lower end surface of the sliding scraper 48C. The other components are similar to those of the above-described embodiment.

Since the gaps 58B, 60B are provided, effects that are similar to those of the present embodiment can be obtained. Also, as a result of the protrusion portions 54 being in abutment with the vertical frames 53, opposite vertical portions 50, 50 of the sliding scraper 48C are pressed against respective side surfaces of a guide rail 12, and thus effect that are similar to those of the above-described first embodiment can be obtained.

The sliding scraper 48D illustrated in FIG. 5B is similar to the sliding scraper 48C illustrated in FIG. 5A except that a cutout portion 67 is provided at an upper end of an outer side surface of each vertical portion 50.

Although the present embodiment has been described in terms of a case where a bulge portion 57 is provided at a horizontal frame 59, the present invention is not limited to this case, and a bulge portion may be provided at an outer surface of a horizontal portion 55, 66.

3. Third Embodiment

Figure 6:
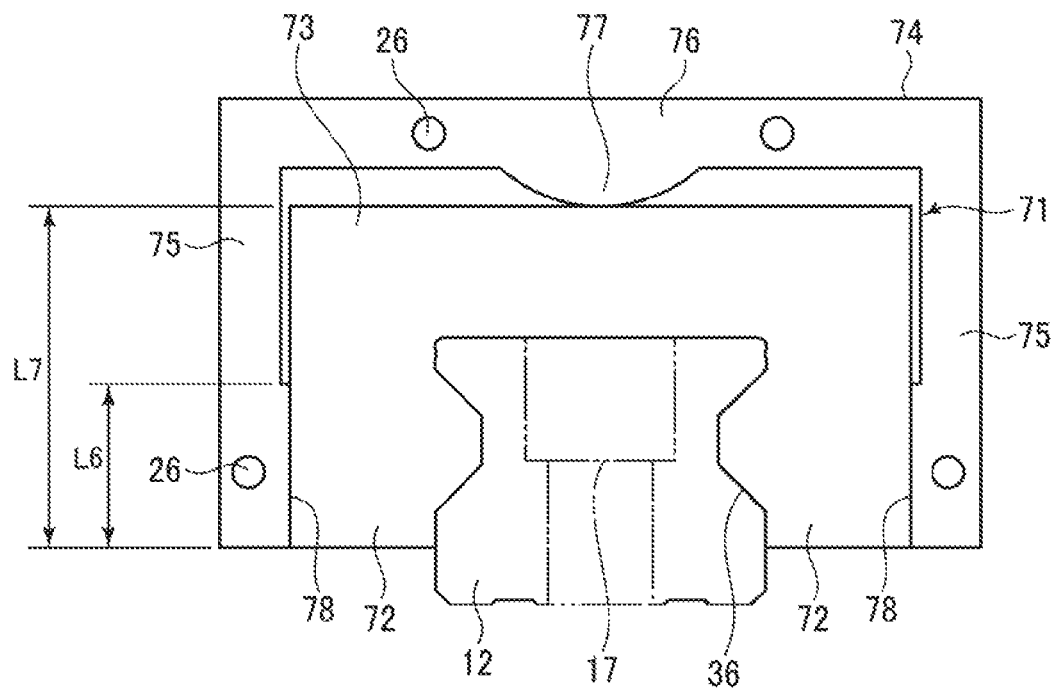
FIG. 6 is a front view illustrating a state in which a sliding scraper according to a third embodiment is attached to an attachment plate.

Although the first and second embodiments above has been described in terms of a case where a protrusion portion that protrudes toward a relevant vertical frame of an attachment plate is provided at each of opposite vertical portions of a sliding scraper, the present invention is not limited to this case. For example, as illustrated in FIG. 6, a bulge portion 77 and protrusion portions 78 may be provided at a horizontal frame 76 and vertical frames 75 of an attachment plate 74, respectively. It is preferable that a length L6 in a vertical direction of the protrusion portions 78 be no more than 60%, preferably no more than 50%, but no less than 5%, preferably no less than 10%, of a length L7 of vertical portions 72 of a sliding scraper 71.

Each of the vertical portions 72 and a horizontal portion 73 of the sliding scraper 71 is linear, that is, respective outer surfaces on the attachment plate 74 side of the opposite vertical portions 72, 72 and the horizontal portion 73 of the sliding scraper 71 are flat.

Note that reference numeral 17 denotes an attachment screw hole provided to fix a guide rail 12 via, e.g. a screw.

In the case of the present embodiment, the opposite vertical portions 72, 72 of the sliding scraper 71 are pressed against side surfaces of the guide rail 12 by the protrusion portions 78 of the attachment plate 74 and thus effects that are similar to those of the above-described first embodiment can be obtained.

4. Fourth Embodiment

Next, an attachment structure for a sliding scraper according to a fourth embodiment will be described. Components that are similar to those of the first to third embodiments are provided with reference numerals that are similar to those of the first to third embodiments and description thereof will be omitted for simplicity.

Figure 7:
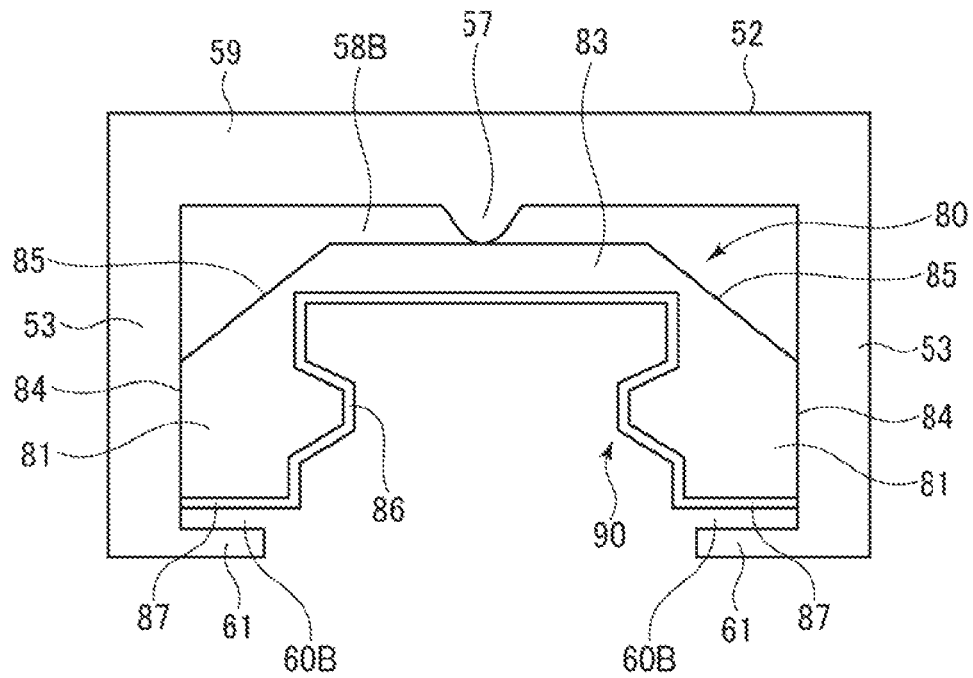
FIG. 7 is a front view illustrating a state in which a sliding scraper according to a fourth embodiment is attached to an attachment plate.
Figure 8A:
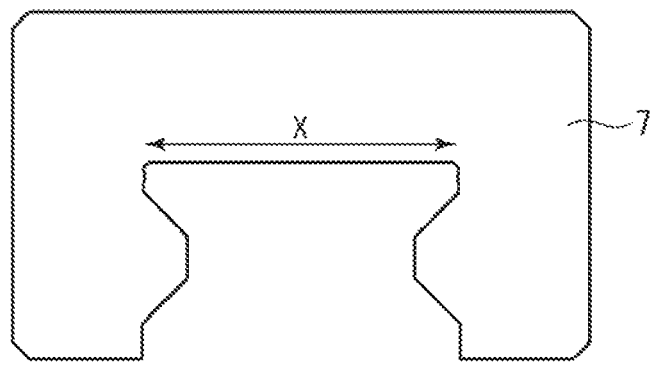
FIG. 8A is a front view illustrating a conventional sliding scraper and FIG. 8B is an explanatory diagram illustrating a state in which the sliding scraper in FIG. 8A is attached to an attachment plate.
Figure 8B:
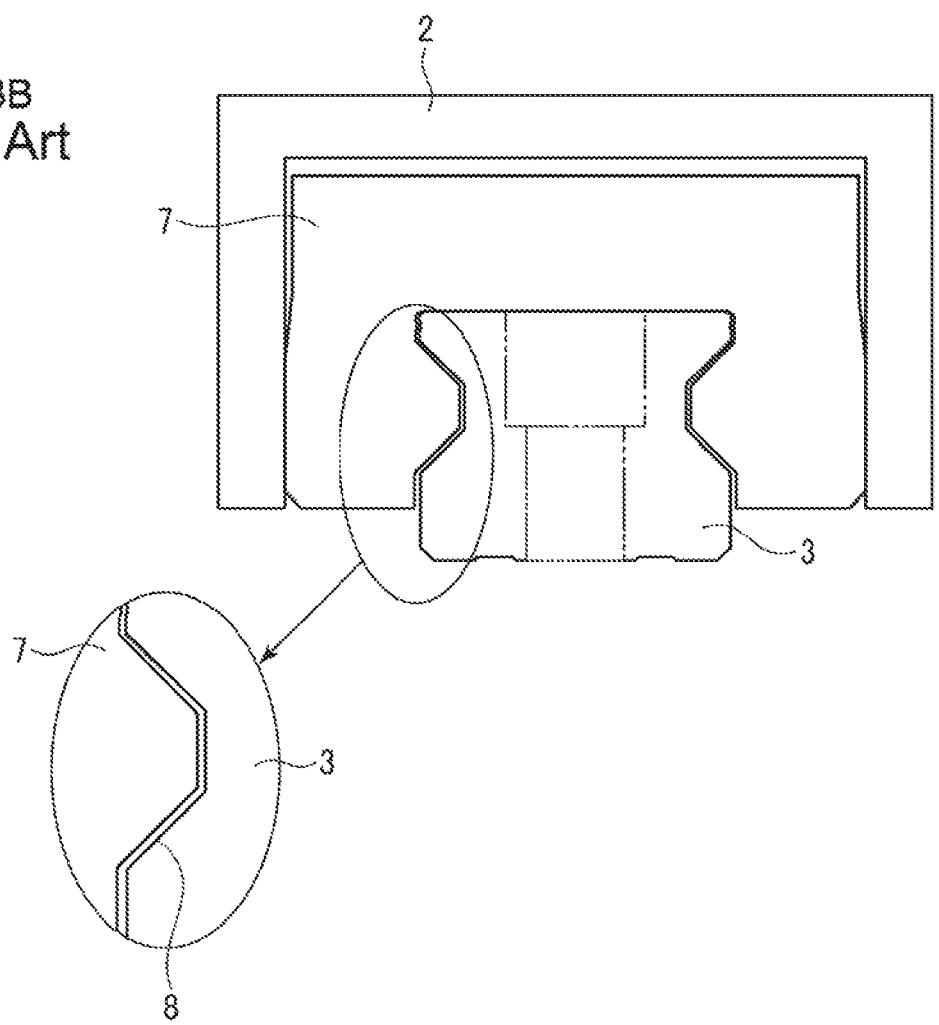

As illustrated in FIG. 7, a sliding scraper 80 includes opposite vertical portions 81, 81 and a horizontal portion 83 connecting the opposite vertical portions 81, 81, and a groove portion 90 that are in sliding contact with a guide rail 12 is formed. Protrusion portions 84, 84 are provided at respective outer side surfaces of lower ends of the opposite vertical portions 81, 81, the protrusion portions 84, 84 being in abutment with respective inner side surfaces of vertical frames 53 of an attachment plate 52. A sliding layer 86 is provided at an inner surface of the groove portion 90 and lower end surfaces 87 of the opposite vertical portions 81, 81. A cutout portion 85 is provided at an upper end of an outer side surface of each of the opposite vertical portions 81, 81.

The sliding layer 86 of the sliding scraper 80 includes a flat surface that is parallel to a direction of movement of a slider 14 and is in contact with a surface of a guide rail 12 at the flat surface. A thickness of the sliding scraper 80 is not specifically limited, but may be 0.5 to 8.0 mm, preferably, 1.0 to 5.0 mm.

As a result of the protrusion portions 84 being in abutment with the respective vertical frames, the opposite vertical portions 81, 81 of the sliding scraper 80 are pressed against respective side surfaces of the guide rail 12, and thus effects that are similar to those of the above-described first embodiment can be obtained.

In the case of the present embodiment, the sliding scraper 80 includes the sliding layer 86 that is contact with the guide rail 12 at the flat surface, enabling suppression of resistance to sliding on the surfaces of the guide rail 12 and thus enabling enhancement in durability.

The sliding scraper 80 includes the sliding layer 86 also provided at the lower end surfaces 87 that are not in contact with the guide rail 12 and can prevent damage such as cracking of the vertical portions 81 due to, e.g., foreign substances.

5. Modifications

The present invention is not limited to the above embodiments and various improvements and changes are possible within the scope of the claims. For example, the components of the first to fourth embodiments may be combined as appropriate. More specifically, a sliding layer provided at inner surfaces of a groove portion and respective lower end surfaces of opposite vertical portions may be applied to the first to third embodiments.

Although in the description of the first to third embodiments, only a single sliding scraper is attached to an attachment plate, but a plurality of sliding scrapers may be stacked and fitted to an attachment plate.

REFERENCE SIGNS LIST 10A linear guide device
12 guide rail
14 slider
16, 52, 74 attachment plate
18, 53, 75 vertical frame
20, 59, 76 horizontal frame
22 square U-shape groove
24 bulge portion
30A, 48A, 71, 80 sliding scraper
32, 41, 50, 62, 72, 81 vertical portion
34, 55, 66, 73, 83 horizontal portion
36, 90 groove portion
38, 54, 64, 78, 84 protrusion portion
40, 56 recess portion
43, 44 protrusion portion
57, 77 bulge portion 86 sliding layer
87 lower end surface

The invention claimed is:

1. An attachment structure for a sliding scraper, the attachment structure comprising:
   a slider slidably straddling over a guide rail;
   an attachment plate having a square U-shape attached to an end surface of the slider and including opposite vertical frames and a horizontal frame connecting the opposite vertical frames; and
   a sliding scraper fitted in a square U-shape groove of the attachment plate and including opposite vertical portions and a horizontal portion connecting the opposite vertical portions, and a groove portion that is in sliding contact with the guide rail,
   wherein at at least an open end portion of an inner side surface of each of the opposite vertical frames of the attachment plate or at least an end portion of an outer side surface of each of the opposite vertical portions of the sliding scraper, the end portion facing the open end portion, a protrusion portion at which the relevant vertical frame and the relevant vertical portion are in abutment with each other is provided, and
   wherein the sliding scraper includes an elastic material including, at an inner surface of the groove portion, a sliding layer in which fiber and an elastomer are integrated.

2. The attachment structure for a sliding scraper according to claim 1, wherein at an inner surface of the horizontal frame of the attachment plate or an outer surface of the horizontal portion, the outer surface facing the horizontal frame, a bulge portion at which the horizontal frame and the horizontal portion are in abutment with each other is provided.

3. The attachment structure for a sliding scraper according to claim 2, wherein a recess portion is formed in the outer surface of the horizontal portion of the sliding scraper, the outer surface facing the horizontal frame of the attachment plate, and the bulge portion formed at the inner surface of the horizontal frame of the attachment plate is in abutment with the recess portion.

4. The attachment structure for a sliding scraper according to claim 1, wherein the sliding layer includes a fabric material with the elastomer impregnated therein.

5. The attachment structure for a sliding scraper according to claim 1, wherein the sliding layer includes a flat surface parallel to a direction of movement of the slider.

6. The attachment structure for a sliding scraper according to claim 1, wherein the sliding layer is provided at the inner surface of the groove portion and respective lower end surfaces of the opposite vertical portions.

7. A linear guide device comprising a guide rail and a slider slidably straddling over the guide rail, a sliding scraper including a groove portion that is in sliding contact with the guide rail being fitted in a square U-shape groove of an attachment plate attached to an end surface in a sliding direction of the slider,
   wherein the sliding scraper includes the attachment structure according to claim 1.

* * * * *